United States Patent
Cowles

(10) Patent No.: US 8,858,179 B2
(45) Date of Patent: Oct. 14, 2014

(54) HELICOPTER ROTOR CONTROL SYSTEM

(75) Inventor: Devon Cowles, New Milford, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 805 days.

(21) Appl. No.: 12/959,922

(22) Filed: Dec. 3, 2010

(65) Prior Publication Data

US 2012/0156033 A1    Jun. 21, 2012

Related U.S. Application Data

(60) Provisional application No. 61/287,833, filed on Dec. 18, 2009.

(51) Int. Cl.
| B64C 11/38 | (2006.01) |
| B64C 27/10 | (2006.01) |
| B64C 27/32 | (2006.01) |
| B64C 27/12 | (2006.01) |
| B64C 27/72 | (2006.01) |

(52) U.S. Cl.
CPC ......... *B64C 27/10* (2013.01); *B64C 2027/7216* (2013.01); *Y02T 50/34* (2013.01); *B64C 27/32* (2013.01); *B64C 27/12* (2013.01)
USPC ........................................................ 416/147

(58) Field of Classification Search
CPC ........ B64C 27/10; B64C 27/12; B64C 27/32; B64C 27/64; B64C 2027/7216
USPC ................................................... 416/26, 150
See application file for complete search history.

(56) References Cited

U.S. PATENT DOCUMENTS

| 4,274,808 A * | 6/1981 | Garner et al. ................. 416/114 |
| 4,367,063 A | 1/1983 | Herruzo |
| 5,058,824 A | 10/1991 | Cycon et al. |
| 5,165,854 A | 11/1992 | Cicare |
| 5,826,822 A | 10/1998 | Rehm |
| 6,672,538 B2 | 1/2004 | Millea et al. |
| 6,886,777 B2 * | 5/2005 | Rock ......................... 244/17.23 |
| 7,083,142 B2 | 8/2006 | Scott |
| 7,118,340 B2 | 10/2006 | D'Anna |
| 7,210,651 B2 | 5/2007 | Scott |
| 7,585,153 B1 | 9/2009 | Schmaling et al. |

* cited by examiner

Primary Examiner — Edward Look
Assistant Examiner — Jeffrey A Brownson
(74) Attorney, Agent, or Firm — Cantor Colburn LLP

(57) ABSTRACT

A rotor control system operatively linked to a plurality of rotor blades includes a swashplate assembly having a stationary member and a rotating member. A blade attachment member is operatively connected to the plurality of rotor blades and a control horn is operatively connected to the blade attachment member and one of the plurality of rotor blades. At least one hydraulic actuator member is operatively coupled to the control horn and at least one hydraulic actuator element is operatively coupled to the swashplate assembly and the at least one hydraulic actuator member. The at least one hydraulic actuator member transmits control signals from the swashplate assembly to the one of the plurality of rotor blades through the at least one hydraulic actuator member.

14 Claims, 3 Drawing Sheets

HELICOPTER ROTOR CONTROL SYSTEM

CROSS REFERENCE TO RELATED APPLICATIONS

This application claims the benefit of U.S. Provisional Application No. 61/287,833 filed on Dec. 18, 2009 and which is incorporated by reference herein in its entirety.

BACKGROUND OF THE INVENTION

The subject matter disclosed herein relates to the art of helicopters and, more specifically, to a helicopter rotor control system.

Control of rotary-wing aircraft is effected by rotor blade pitch variations. Rotor blades are controlled individually (cyclic control) and collectively (collective control). Main rotor pitch control is typically achieved through a swashplate assembly that transfers motion of non-rotating control members to rotating control members. The swashplate assembly is typically concentrically mounted about a rotor shaft. A typical swashplate assembly includes two rings connected by a series of bearings. One ring is mounted to the aircraft (stationary) and another ring is mounted to a hub portion of the rotor shaft (rotating). Movements in the stationary ring are transferred to the rotating ring to control blade pitch.

Rotary-wing aircraft having dual or counter-rotating rotor blade systems require both an upper rotor control system and a lower rotor control system. The lower rotor control system utilizes a conventional swashplate assembly mounted about a lower control rotor shaft. The upper rotor control system is typically more complex and utilizes an upper rotor control shaft mounted through the lower rotor shaft. The upper rotor control system includes an upper rotor swashplate assembly, a motion multiplier, and long control rods located inside the upper rotor control shaft. The long control rods are formed of a relatively heavy, large diameter material that is resistant to buckling forces generated by blade pitching loads in the upper rotor. The heavy large diameter rods add weight to the upper control system and are difficult to package within the upper rotor control shaft.

BRIEF DESCRIPTION OF THE INVENTION

According to one aspect of the invention, a rotor control system operatively linked to a plurality of rotor blades includes a swashplate assembly having a stationary member and a rotating member. A blade attachment member is operatively connected to the plurality of rotor blades and a control horn is operatively connected to the blade attachment member and one of the plurality of rotor blades. At least one hydraulic actuator member is operatively coupled to the control horn and at least one hydraulic actuator element is operatively coupled to the swashplate assembly and the at least one hydraulic actuator member. The at least one hydraulic actuator member transmits control signals from the swashplate assembly to the one of the plurality of rotor blades through the at least one hydraulic actuator member.

According to another aspect of the invention, a method of controlling a rotor assembly of a helicopter includes shifting a stationary swashplate member. The stationary swashplate member acting upon a rotating swashplate member. The method also includes activating at least one hydraulic actuator element operatively coupled to the rotating swashplate member, transmitting a control signal from the at least one hydraulic actuator element to at least one hydraulic actuator member operatively coupled to one of a plurality of rotor blades through a control horn, and adjusting an aerodynamic characteristic of the one of the plurality of rotor blades in response to the control signal.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
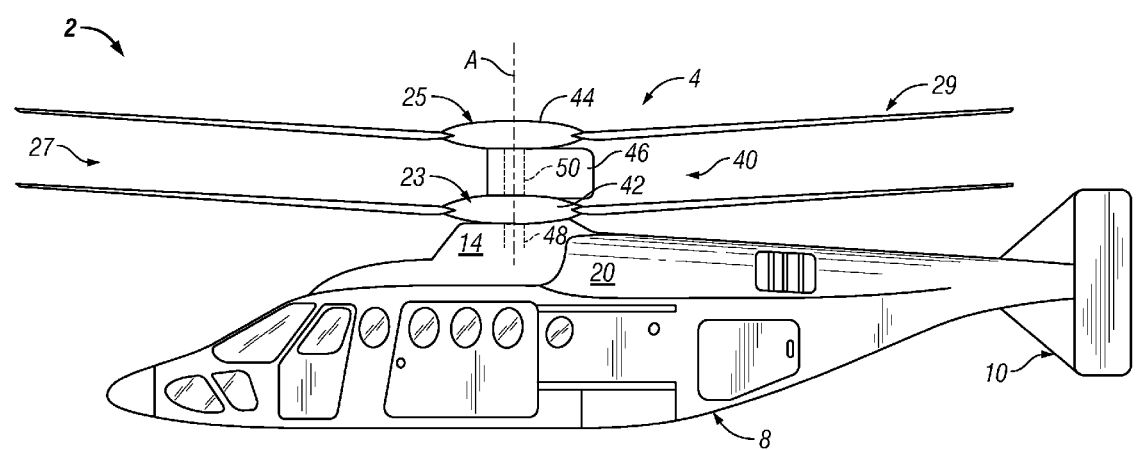
FIG. 1 is an elevational view of a dual rotor rotary wing aircraft constructed in accordance with an exemplary embodiment.

With reference to FIG. 1, a vertical take off and landing (VTOL) rotary-wing aircraft constructed in accordance with an exemplary embodiment is indicated generally at 2. Rotary-wing aircraft 2 includes a dual, counter-rotating, coaxial rotor system 4 that rotates about an axis of rotation A. Rotary-wing aircraft 2 includes an airframe 8 as well as an optional translational thrust system 10. Translational thrust system 10 provides translational thrust generally parallel to an aircraft longitudinal axis (not separately labeled). Although a particular aircraft configuration is illustrated in the disclosed embodiment, other rotary-wing aircraft including aircraft having both dual and single rotor systems will also benefit from the present invention.

Further illustrated in FIG. 1, rotary-wing aircraft 2 includes a main gear box 14 which, in accordance with the exemplary embodiment shown, is located above the aircraft cabin. Main gear box 14 is configured to drive rotor system 4 and translational thrust system 10. In a manner known in the art, main gear box 14 is driven by one or more engines 20. In the exemplary embodiment shown, main gear box 14 is interposed between the engines, rotor system 4 and translational thrust system 10.

Figure 2:
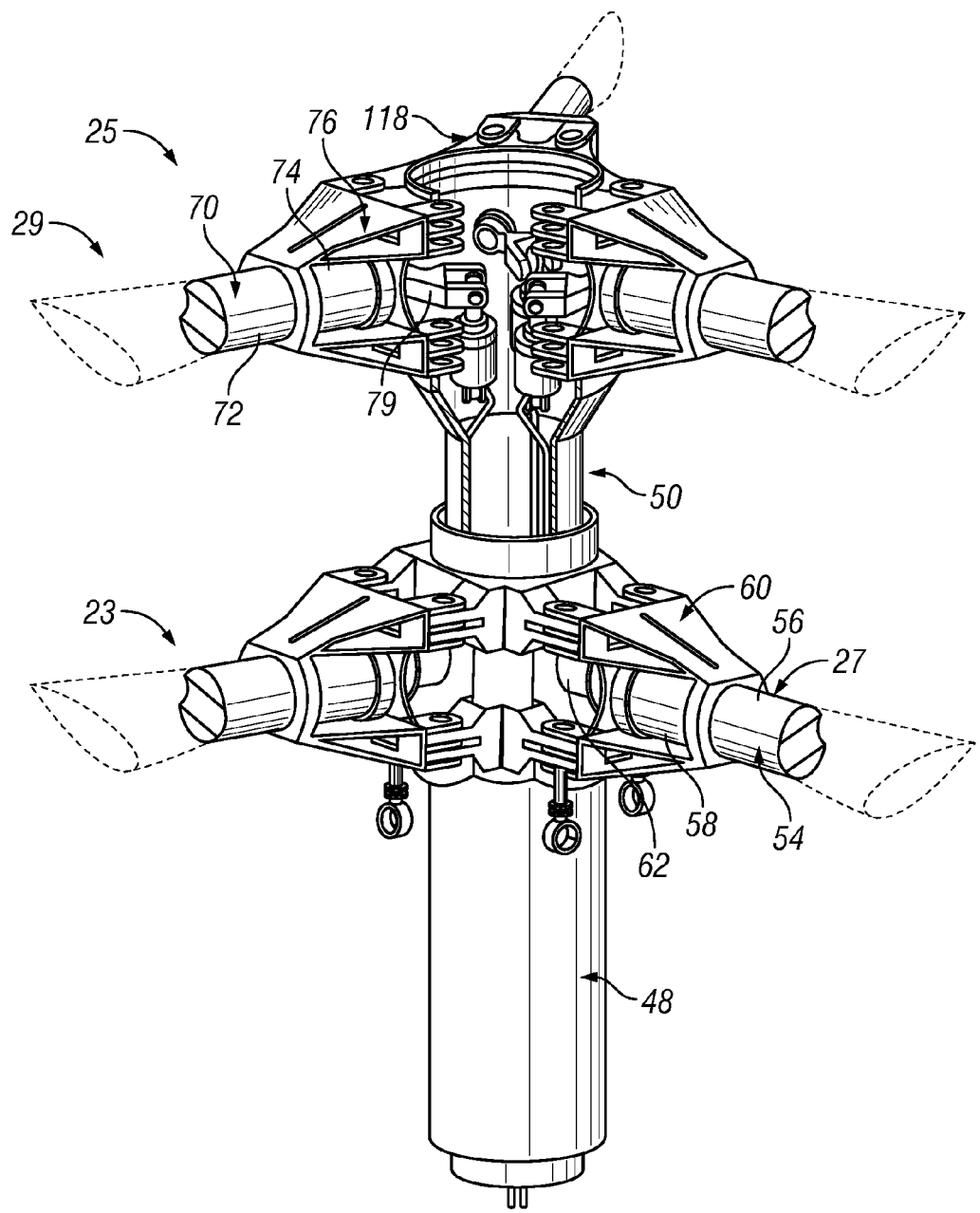
FIG. 2 is a partial perspective view of upper and lower rotor assemblies of the rotary wing aircraft of FIG. 1.

As best shown in FIGS. 1 and 2, rotor system 4 includes a lower rotor system 23 and an upper rotor system 25. Each rotor system 23, 25 includes a plurality of rotor blade assemblies, one of which is indicated at 27 in connection with lower rotor system 23 and one of which is indicated at 29 in connection with upper rotor system 25. Rotor system 4 is also shown to include a rotor hub faring system 40 that is located between and around lower and upper rotor systems 23 and 25. Rotor hub faring system 40 includes a lower hub faring 42, and upper hub faring 44 and a shaft faring 46. Lower rotor system 23 is controlled through a lower rotor shaft or control member 48 while upper rotor system 25 is controlled through an upper rotor shaft or control member 50.

Upper control member 50 extends through lower control member 48 and shaft faring 46. Also shown in FIG. 2, rotor blade assembly 27 includes a rotor blade 54, a rotor blade spindle 56, and a rotor blade bearing 58 which supports rotor blade spindle 56 within a bearing housing 60. It should be understood that various other blade attachments may also be utilized without departing from the scope of the exemplary embodiment. Rotor blade assembly 27 is also shown to include a rotor blade pitch control horn 62 mounted for rotation with rotor blade spindle 56. In a manner known in the art, rotor blade control horn 62 is mounted to a lower swash plate (not shown) through a control rod (not separately labeled) that imparts the desired pitch control to rotor blade 54.

Similarly, rotor blade assembly 29 includes a plurality of rotor blades, one of which is indicated at 70, a rotor blade spindle 72, and a rotor blade bearing 74 which supports rotor blade spindle 72 within a bearing housing 76. An upper rotor blade pitch control horn 79 is operatively coupled to rotor blade 70. In a manner that will be described more fully below, control horn 79 imparts a desired pitch control to rotor blade 70. At this point, it should be understood that the above described structure is provided for the sake of completeness and to enable a better understanding of the exemplary embodiment which is directed to the particular structure and operation of upper control member 50.

Figure 3:
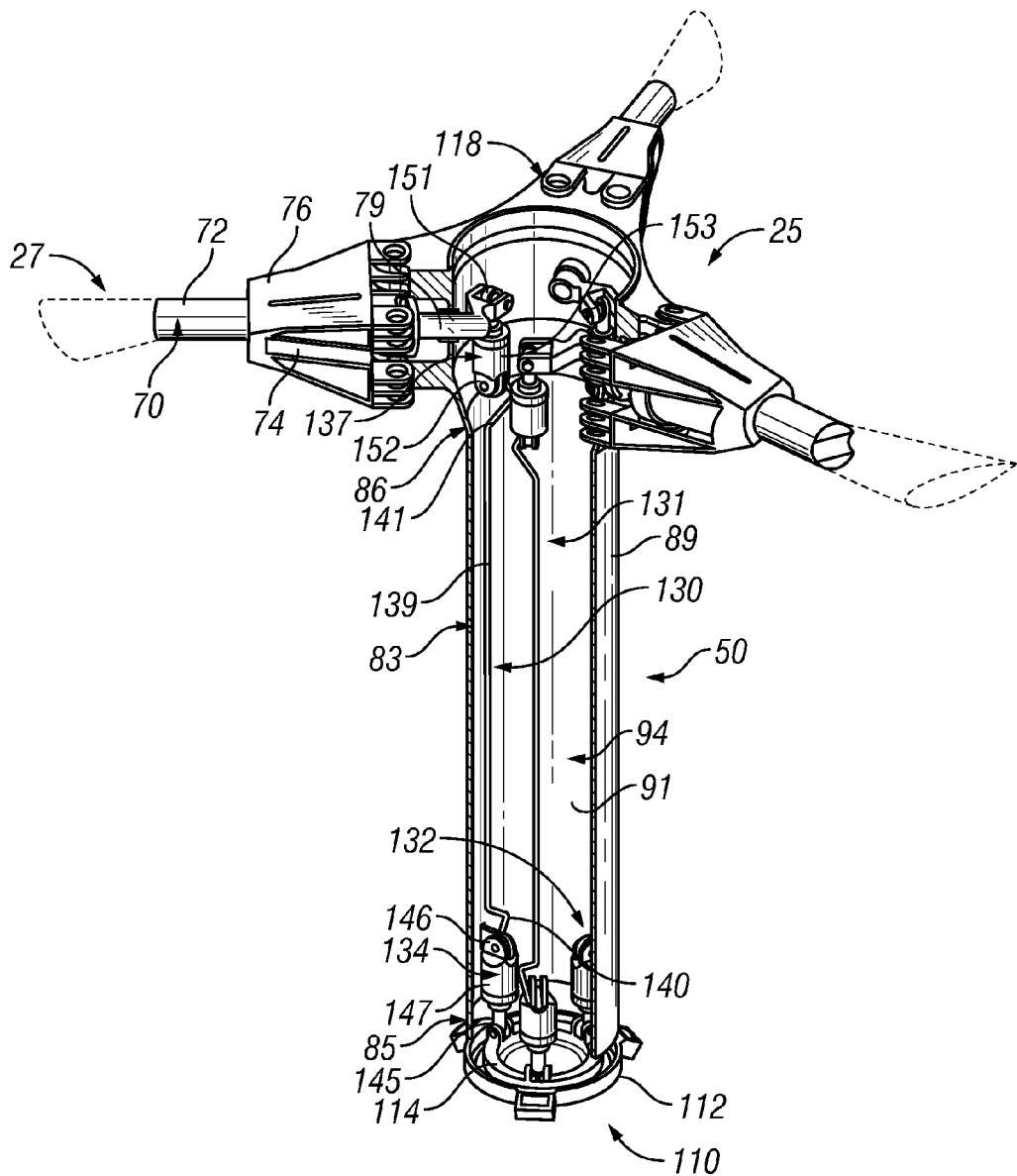
FIG. 3 is a partial perspective view of a control rod for the upper rotor assembly of FIG. 2.

As best shown in FIG. 3, upper control member 50 includes a shaft member 83 having a first end portion 85 that extends to a second end portion 86. Shaft member 83 includes an external surface 89 and an internal surface 91 that defines a hollow interior portion 94. First end portion 85 is operatively coupled to an upper rotor swashplate assembly 110. Upper rotor swash plate assembly 110 includes a stationary member 112 that is fixed relative to airframe 8 and a rotating member 114 that is configured to rotate with upper rotor system 25. Second end portion 86 of shaft member 83 is coupled to a blade attachment member 118 that supports each of the plurality of rotor blades of upper rotor system 25. Shaft member 83 also supports a plurality of rotor blade control or actuation systems 130-132 that impart the desired pitch control to each of the plurality of rotor blades. As each of the plurality of blade actuation systems 130-132 is substantially similar, a detailed discussion will follow referencing FIG. 3 and blade actuating system 130, with an understanding that the remaining blade actuation systems 131 and 132 include similar structure.

Blade actuation system 130 includes a hydraulic actuator element 134 operatively coupled to swash plate assembly 110, and a hydraulic actuator member 137 that is operatively coupled to control horn 79 through a hydraulic line 139 having a first end portion 140 that extends to a second end portion 141. More specifically, hydraulic actuator element 134 includes a first end or piston portion 145 that extends to a second end 146 through an intermediate or chamber portion 147. First end 145 is coupled to rotating member 114 while second end 146 is mounted to internal surface 91 of shaft member 83 and is fluidly coupled to first end portion 140 of hydraulic line 139. With this arrangement, oscillations of rotating member 114 resulting from cyclic control inputs, move first end 145 into chamber portion 147. As first end 145 moves into chamber portion 147, a hydraulic pressure wave or signal is created. The signal passes through hydraulic line 139 toward hydraulic actuator element 137 which, in turn, moves control horn 79 to control pitch of rotor blade 70. At this point it should be understood that while blade actuation system 130 is shown having a single hydraulic line, multiple hydraulic lines can also be employed.

In a manner similar to that described above, hydraulic actuator element 137 includes a first end or piston section 151 that extends to a second end section 152 through an intermediate or chamber section 153. First end section 151 is coupled to control horn 79 while second end section 152 is fixedly mounted to internal surface 91 of shaft member 83 and fluidly coupled to second end portion 141 of hydraulic line 139. With this arrangement, the hydraulic pressure wave or signal passing through hydraulic line 139 enters chamber section 153 of hydraulic actuator member 137. The hydraulic pressure acts upon and shifts first end section 151 resulting in a corresponding movement of control horn 79. In this manner, blade actuation system 130 translates cyclic control inputs to rotor blade 70.

At this point, it should be understood that the exemplary embodiments describe a control system for a rotary-wing aircraft that employs hydraulic actuator to transmit input signals to make pitch adjustments and rotor blades. By eliminating the conventional control rods, the control system constructed in accordance with the exemplary embodiment is resistant to stresses and internal forces typically realized in standard rotor systems, particularly those for upper rotor systems in a dual rotor system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor control system operatively linked to a plurality of rotor blades, the rotor control system comprising:
    a swashplate assembly including a stationary member and a rotating member;
    a blade attachment member operatively connected to the plurality of rotor blades;
    a control horn operatively connected to the blade attachment member and one of the plurality of rotor blades;
    at least one hydraulic actuator member operatively coupled to the control horn; and
    at least one hydraulic actuator element operatively coupled to the swashplate assembly and the at least one hydraulic actuator member, the at least one hydraulic actuator element transmitting control signals from the swashplate assembly to the one of the plurality of rotor blades through the at least one hydraulic actuator member.

2. The rotor control system according to claim 1, further comprising: at least one hydraulic line fluidly connected between the at least one hydraulic actuator member and the at least one hydraulic actuator element, the at least one hydraulic actuator element transmitting control signals from the swashplate assembly to the one of the plurality of rotor blades through the at least one hydraulic actuator member via the at least one hydraulic line.

3. The rotor control system according to claim 1, further comprising: a shaft member including a first end portion operatively coupled to the swashplate assembly and extending to a second end portion operatively coupled to the blade attachment member, the shaft member including an external surface and an internal surface that defines a hollow interior portion.

4. The rotor control system according to claim 3, wherein the first end portion of the shaft member is operatively coupled to the swashplate assembly through the at least one hydraulic actuator element.

5. The rotor control system according to claim 4, wherein the second end portion of the shaft member is operatively coupled to the blade attachment member through the at least one hydraulic actuator member.

6. The rotor control system to claim 3, wherein the shaft member extends through a control shaft for another plurality of rotor blades.

7. The rotor control system according to claim 1, wherein the at least one hydraulic actuator element is connected to the rotating member of the swashplate assembly.

8. The rotor control system according to claim 1, further comprising: a dual rotor rotary-wing aircraft, the plurality of rotor blades constitute one of a lower rotor system and an upper rotor system.

9. The rotor control system according to claim 8, wherein the plurality of rotor blades constitute an upper rotor system.

10. A method of controlling a rotor assembly of a helicopter, the method comprising:
   shifting a stationary swashplate member, the stationary swashplate member acting upon a rotating swashplate member;
   activating at least one hydraulic actuator element operatively coupled to the rotating swashplate member;
   transmitting a control signal from the at least one hydraulic actuator element to at least one hydraulic actuator member operatively coupled to one of a plurality of rotor blades through a control horn; and
   adjusting an aerodynamic characteristic of the one of the plurality of rotor blades in response to the control signal.

11. The method of claim 10, wherein transmitting a control signal includes sending a pressurized fluid from the at least one hydraulic actuator element toward the at least one hydraulic actuator member.

12. The method of claim 10, wherein the at least one hydraulic actuator member shifts the control horn to adjust the aerodynamic characteristic of the one of the plurality of rotor blades.

13. The method of claim 12, wherein the at least one hydraulic actuator member pivots the control horn to adjust a pitch of the one of the plurality of rotor blades.

14. The method of claim 10, wherein transmitting the control signal from the at least one hydraulic actuator element to the at least one hydraulic actuator member includes passing the control signal through a rotor control shaft operatively associated with another plurality of rotor blades.

* * * * *